United States Patent
Gravino et al.

(10) Patent No.: US 10,237,599 B1
(45) Date of Patent: Mar. 19, 2019

(54) SYNCHRONIZATION OF USERS AND USER ACTIONS BETWEEN DISPARATE VIDEO DISTRIBUTION SYSTEMS

(71) Applicant: Cox Communications, Inc., Atlanta, GA (US)

(72) Inventors: Douglas D. Gravino, Roswell, GA (US); Charles P. Scarborough, Marietta, GA (US); Thomas G. Holzman, Marietta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/109,071

(22) Filed: Dec. 17, 2013

Related U.S. Application Data

(60) Provisional application No. 61/745,941, filed on Dec. 26, 2012.

(51) Int. Cl.
*H04N 21/258* (2011.01)

(52) U.S. Cl.
CPC . *H04N 21/25891* (2013.01); *H04N 21/25875* (2013.01)

(58) Field of Classification Search
None
See application file for complete search history.

(56) References Cited

U.S. PATENT DOCUMENTS

| | | | | |
|---|---|---|---|---|
| 7,849,204 | B2 * | 12/2010 | Yared | G06F 21/41 709/217 |
| 2007/0038567 | A1 * | 2/2007 | Allaire | G06Q 30/0239 705/50 |
| 2007/0169144 | A1 * | 7/2007 | Chen | H04N 7/17318 725/30 |
| 2008/0134295 | A1 * | 6/2008 | Bailey | G06F 21/41 726/4 |
| 2010/0228836 | A1 * | 9/2010 | Lehtovirta | H04L 12/00 709/220 |
| 2012/0008786 | A1 * | 1/2012 | Cronk et al. | 380/282 |

* cited by examiner

*Primary Examiner* — Fernando Alcon
(74) *Attorney, Agent, or Firm* — Merchant & Gould

(57) ABSTRACT

Synchronization of users between a CATV system and a disparate video distribution system is provided. A network account identifier tied to a household subscriber account may be linked to a plurality of users in the household. A strong authentication may only be required once (or at infrequent intervals) to initially validate credentials and authorize a requesting device. Subsequently, the device may be configured to retrieve accounts for all users in the household. Because the device is now known to the service provider, easy user-switching rules may be applied. Each user in a household may get his own personalized recommendations, use his own preferences, or tie to other individualized service personas. Any changes or updates in personalized information for a video user may be synchronized back to the originating system such that the next time the particular video user uses a CATV system device, any changes/updates may be reflected.

20 Claims, 5 Drawing Sheets

US 10,237,599 B1

SYNCHRONIZATION OF USERS AND USER ACTIONS BETWEEN DISPARATE VIDEO DISTRIBUTION SYSTEMS

CROSS-REFERENCE TO RELATED APPLICATIONS

The present application claims priority to U.S. Provisional Patent Application No. 61/745,941 titled "Synchronization of Users Between Disparate Video Distribution Systems" filed Dec. 26, 2012, the disclosure of which is hereby incorporated by reference in its entirety.

BACKGROUND

Multi-channel video services, such as a cable television services system, typically allow a user to set up multiple user accounts allowing various users within a household to each have individualized settings, preferences, etc. Oftentimes, advanced features such as video recommendations or parental controls may be tied to a specific user. Typically, switching between user accounts via a set-top box device is a simple process. Set-top box devices are most often located in a "trusted" location (e.g., a user's home); and since video services providers know which set-top box device is located in which home, there may not be a question of whether a particular user's home is authorized to receive video content. Accordingly, switching between user accounts within a home is performed with an inherent level of built-in trust. For example, generally, household members trust each other, providing little reason to utilize a secure log-in for user-switching unless for parental control reasons (e.g., shielding children from objectionable content). If a secure log-in is utilized, a user may enter a simple code or perform another lower-security type of sign-in.

Many video service providers also provide Internet Protocol (IP)-network based services (e.g., video services) that operate on a per-user basis (e.g., each user enters a username and password to access a particular service). Video services provided on an open network, such as the Internet, may be accessed by various users, for example, individuals with an Internet connection. Because video services may be considered valuable, service providers may enforce strong password policies, use encryption for video transport, etc. When strong password policies are enforced, strong passwords may be required. Accordingly, when sharing a single physical device (e.g., a tablet computing device, a video-capable smartphone, a computer, or other Internet video streaming device) in a family situation, logging in and logging out between users may be considered a hassle.

Oftentimes, a user in a household may simply log in once and not log out again. As such, individual users in the household may not receive individualized recommendations, set their own "favorites," tie their own viewing to a social network user persona, etc. From a service provider's perspective, a determination may not be able to be made as to which user is watching what content, which may be considered a disadvantage to both the provider and to the users.

It is with respect to these and other considerations that the present invention has been made.

SUMMARY

Embodiments of the present invention provide for synchronization of users and user actions between disparate video systems such that an IP network-based device (e.g., a tablet computing device, a laptop computer, a mobile communication device, etc.) can operate with simpler user account switching, for example, such as that found on a STB device. A network (e.g., Internet) account identifier such as a unique account number, a social security number, service address, a phone number, a social network profile, an email address, etc., tied to an individual subscriber account belonging to a household may be entered. Because video set-top box users are tied back to a same subscriber household account, the unique account identifier may be linked to a family of video users. A strong authentication (e.g., a username and password) may only be required once (or at infrequent intervals) to initially validate credentials and authorize the requesting device (e.g., tablet device, laptop computer, mobile communication device, etc.). A user may be provided with a user experience on the IP network-based device wherein his/her profile properties, settings/preferences, recommendation likes and dislikes profile, parental control permissions, PIN codes, DVR recordings, or other individualized information associated with his/her individual household user account may be synchronized. For example, each user in a household may receive his/her own personalized recommendations, use his/her own preferences, tie to other individualized service personas (e.g., social networking, etc.).

Subsequently, the device may be configured to retrieve video set-top box user accounts for all users in the household. Because the device is now known to the service provider, easy user-switching rules may be applied. For example, moving between multiple users within a household may be done with a same inherent level of trust where PINs and such may or may not be required.

A user's behaviors, actions, preferences, etc., tracked via the IP network-based device (or video programming service application running on the IP network-based device) may be synchronized back to the originating system such that the next time the particular video user uses his STB, the changes/updates may be reflected there also.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout.

DETAILED DESCRIPTION

Figure 1:
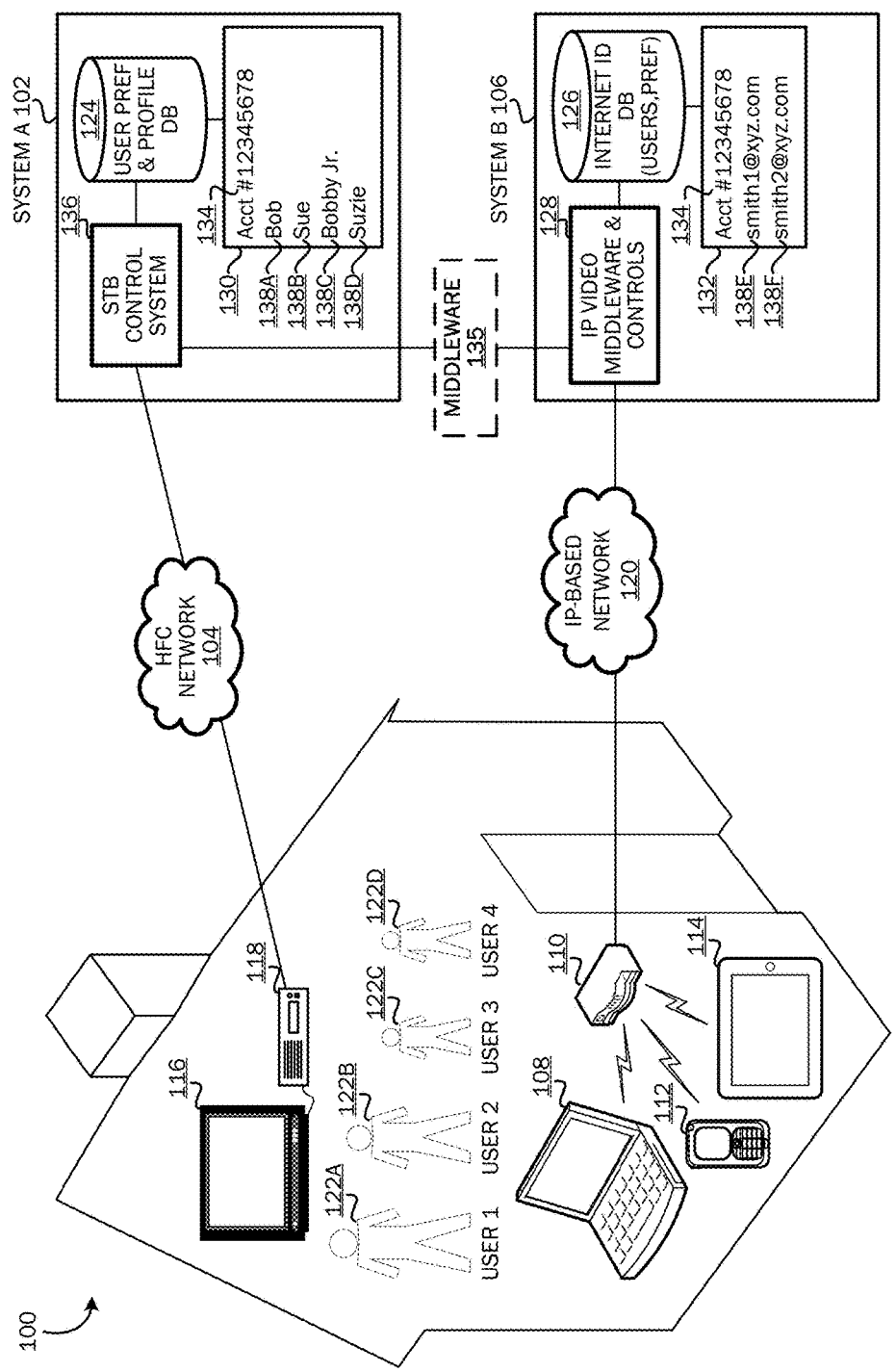
FIG. 1 is a diagram of an exemplary system for providing synchronization of users between disparate video distribution systems according to an embodiment.

Embodiments provide synchronization of users and user actions between disparate video systems. Strong authentication tied to a particular user may be utilized to establish that a particular device is authorized to receive service, for example, a video programming service. An application running on the device may be allowed to easily switch between users in a household that already exist on a separate system such that each household user may access his/her individual recommendations, preferences, etc. that may be associated with his/her individual account on the separate system. Any behaviors, actions, preferences for a video user tracked by the separate system may be synchronized back to the originating system and vice versa.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

An exemplary system 100 for providing synchronization of users between disparate video distribution systems is illustrated in FIG. 1. As illustrated in FIG. 1, a variety of endpoint devices 108, 112, 114, 116, 118 may connect to one or more disparate video distribution systems 102,106 via various types of network architectures (e.g., hybrid fiber coax (HFC) 104, IP-based network 120 such the Internet, etc.). Endpoint devices may include, but are not limited to, a computing device 108, a mobile communication device 112, a tablet/slate computing device 114, an Internet television, or a television set 116 connected to a networked device, such as a set top box (STB) 118. The system 100 may include a router 110 for connecting one or more endpoint devices 108, 112, 114 to a network 120. A variety of services may be provided through a network 104,120 including, for example, traditional digital and analog video programming, high speed Internet access, video-on-demand, and information services.

Synchronization of users and user actions between disparate video systems 102,106 may comprise the following properties: individual video users 122 may be identified as household users 138A-D of a household subscription account 130 in system A 102; a set of profile properties, settings/preferences, recommendation likes and dislikes profile, parental control permissions, PIN codes, DVR recordings, or other individualized information may be associated with each household user 138A-D in system A 102; individual video users or other service users 122 may be identified as members of a household subscription account 132 in system B 106; systems A 102 and B 106 may have an identifying property 134 (e.g., an account number) that can directly or indirectly link subscribing household accounts 130,132 in each system 102,106 with each other. According to an embodiment, systems A 102 and B 106 may comprise a property such that for the same household subscription account 130,132 in both systems 102,106, not all household members who have a household user account 138A-D in system A 102 necessarily have a household user account 138E-F in system B 106 (and not all household members 122 who have a user account 138E-F in system B 106 necessarily have a user account 138A-D in system A 102).

Figure 2:
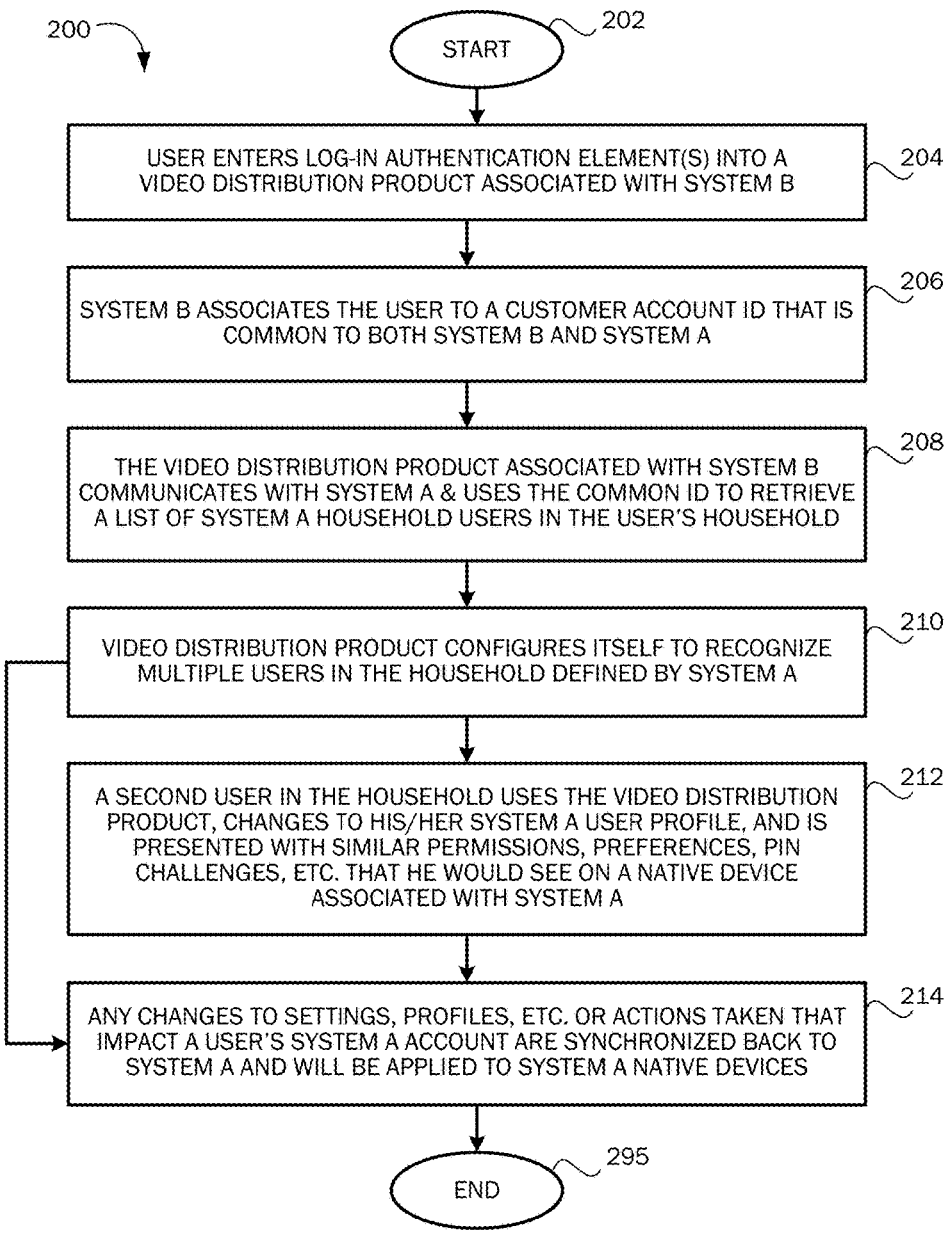
FIG. 2 is a flow chart of a method for providing synchronization of users between disparate video distribution systems according to an embodiment.

Referring now to FIG. 2, a flow chart of a method 200 for providing synchronization of users and user actions between disparate video distribution systems 102,106 according to an embodiment is illustrated. The method 200 starts at OPERATION 202 and proceeds to OPERATION 204 where a user 122 of a video distribution product (e.g., an application running on a viewing device such as a tablet 114, computer/laptop 108, smartphone 112, or other Internet-connected device) logs into an account 132 of a video distribution system (system B 106) via entering a strong authentication, such as an account username and strong password, a username and a password, a retina scan authentication, a fingerprint scan, a gesture authentication, a social network login authentication, an email address and a password, etc. The strong authentication may be utilized to identify that the user 122 is entitled to receive service (e.g., in general from the service provider) and that the device 108, 112, 114 requesting access to the video distribution system 106 is the user's device. For example, a user 122 may enter his service provider's internet-type credentials to log into a video application on a tablet 114.

The method 200 proceeds to OPERATION 206 where the strong authentication may be verified/authenticated, and the user may be associated with an account identifier 134 (e.g., an account number, a social security number, a service address, a phone number, a social network profile; an email address, etc.) that is common to system B 106 and to a system A 102. According to embodiments, the account identifier 134 common to system B 106 and to a system A 102 may be directly used across multiple disparate proprietary platforms as a common identifier. In other cases, there may be an indirect usage where system A 102 and system B 106 each have separate unique identifiers and a second-level system may be utilized to link the separate unique identifiers in system A 102 and system B 106 together. As a result, the video product natively associated with system B 106 may be enabled to identify and access a household subscription account 130 in system A 102.

The method 200 may then proceed to OPERATION 208 where the video distribution product communicates with an individual user profile/preference/account database 124 associated with system A 102 to retrieve a list of household users 138A-D. According to an embodiment, the video distribution product may communicate directly with the individual user profile/preference/account database 124 associated with system A 102; or alternatively, a middleware layer 135 may be built in front of system A 102 to proxy requests from third parties for security or proprietary translation purposes, etc. According to another embodiment, the video distribution product may comprise its own set of middleware 128, with which it may communicate. The middleware 128 may then communicate with system A 102. Accordingly, the video distribution product natively associated with system B 106 may communicate with system A 102. For example, a tablet 114 application may communicate with a proprietary STB user database 124 for a geographic region.

The method 200 may then proceed to OPERATION 210 where the video distribution product may be configured with the household users' 138A-D user profiles based on system A 102. For example, if system A 102 contains a centralized user database 124 that contains users and preferences for all the STBs in a particular geographic region, then a tablet/slate computing device 114 may be able to retrieve a list from the centralized server of STB household users 138A-D in a household affiliated with the account associated with the log-in.

At OPERATION 212, a second user 122 belonging to the system A household account 130 may use the video distribution product, and may be presented with his/her preferences, recommendations, parental control permissions, etc. as if he/she were using a device 118 natively associated with system A 102. For example, a child may pick up a tablet/slate computing device 114 and may easily switch to his/her user profile 138. He may not be prompted for a PIN, may see his/her favorite cartoon channels marked, and may be able to watch the programs he/she normally watches. If the child attempts to access restricted content, for example, an R-rated movie on the tablet 114, he/she may be prevented from doing so by the parental controls associated with system A 102 similarly to how he/she would be restricted from the content while using the STB 118. When the child is finished using the tablet 114, a parent in the household may pick up the tablet to use it. Since the parent's account is likely to be more privileged, the parent may be required to first enter a 4-digit numeric PIN to access his/her profile. The parent may then see his/her recommended content, which may include content that may be restricted to the child.

The method 200 may then proceed to OPERATION 214 where the accounts 330,132 on system A 102 and system B 106 and actions taken by a user may be synchronized. That is, actions taken by a user 122 on system B 106 may cause an action to take place on a device in system A 102 (and vice versa) on behalf of the user as if the user had taken the action directly on the system A device. A user's actions may influence changes such as bookmarks, recordings, viewing history, recommendations, etc. A user 122 of the video product may also make changes to his/her profile on a non-native device 108,112,114. The changes made may be communicated back to system A 102 and applied to system A-native devices 118. Changes may include such information as, parental control permissions, pin codes, user behavior data, changes to the household subscription account, user account profile, deletion of content, etc.

As mentioned above, a user's actions, preferences, changes etc., may be communicated bi-directionally. If a household user account 138 is created on a STB 118, the same household user account 138 may be provided on the non-native device 108,112,114. Additionally, if a user 122 dislikes a program on a STB 118, his/her selection may be reflected in recommendations made on the non-native device 108,112,114. In a case where a video distribution product does not have the same functionalities as another product (e.g., ability to provide like/dislike feedback), the product that does have a particular functionality may still influence the user experience on products that do not. For example, the ability to provide like/dislike feedback may be available on a STB 118 and not on a video programming service application running on a tablet 114; however, a user's like/dislike feedback input on a STB 118 may influence recommendations in the application running on the tablet 114 as well as on the STB.

The following examples include example of synchronization of a user's actions between disparate systems. As a first example, if a user 122 picks up a tablet 114 to view content, switches to his/her user profile (even without a PIN), and views episodes 1 and 2 of a particular television series on video-on-demand (VOD), the tablet application (video distribution product) may communicate the viewing information back to system A 102. Accordingly, when the same user is using a system A-native device (e.g., STB 118), the system A-native device interface may show that episode 3 is recommended as the next episode to view.

According to another example, a video programming service application running on a tablet 114 or computer 108 attached to system B 106 may allow a user 112B to change a channel, start viewing VOD content, etc. as a remote control in real-time on a STB 118 connected to system A 102. When the channel change/VOD start event occurs, the STB 118 may first switch to the user's 122B household user account 138B. Accordingly, any parental controls, closed caption settings, etc. associated with the user's household user account 138B may be applied. The user's viewing activity may be recorded in the activity record for the user, reflecting that a particular show has been viewed for recommendations, recently viewed programs lists, etc.

As another example, a video programming service application running on a tablet 114 or computer 108 attached to system B 106 may allow a user 112B to set a DVR recording on a STB 118 connected to system A 102. The DVR recording may then occur on the STB 118 as if the user had selected to record the content via the STB. Accordingly, if the user has a custom recording list, the content may be applied to his/her personal list of recorded programs; if any prioritization rules have been set (e.g., user 2's 122B content is prioritized over user 1's 122A content), the prioritization rules may be applied; parental controls (if any) for the user 122B may be applied, if any DVR settings have been set (e.g., keep content for seven days before deleting, record in HD, etc.) the DVR settings may be applied, the recording activity may be recorded in the activity records for the user 112B for recommendation purposes, etc.

As another example, a video programming service application running on a tablet 114 or computer 108 attached to system B 106 may allow a user 112B to select a program to add to a "watch later" list, which may then be accessible via a system B or system A device. Or a video programming service application running on a tablet 114 or computer 108 attached to system B 106 may allow a user 112B to purchase an on-demand movie for viewing on a STB 118 attached to system A 102. As with the example above, any parental control settings, historical viewing records, etc. would be synchronized and would be applied to the user 112B. The method 200 may then end at OPERATION 295.

According to embodiments, increased control may be provided by applying role-based accesses to users 122 of system A 102 or system B 106 for specific functions. For example, for purposes of greater control, only the primary household account holder of system B 106 may be allowed to validate a new device 108,112,114 as belonging to the household to create linkage with system A 102. This may prevent a child from giving his system B password to a friend and allowing the friend to then watch video to which the friend is not entitled. According to another embodiment, increased control may be provided by optionally allowing linkage of individual users 122 of system B 106 to particular users 122 of system A 102. If system B 106 and system A 102 both have independent parental control systems for their respective users, transferring appropriate levels of parental controls from one system to another when an existing user of one system is first created in the second may be beneficial. Allowing linkage of individual users of disparate systems may be useful for correlating data collection in both systems such that the activities of a user in a platform associated with system A 102 (e.g., what television programs are watched on a STB 118) may be associated with activities of the same user in a platform associated with system B 106 (e.g., what television programs are watched on a tablet 114).

As should be appreciated, although described in terms of Internet-based video products interacting with traditional multichannel cable television distribution, embodiments may be utilized in other types of disparate video distribution systems. The system may comprise a middleware server-side platform 128 for exposing services to IP video-type devices such as tablets 114, smartphones 112, and computers/laptops 108. This may access an identity managementtype system, which may store usernames, passwords, etc. for authentication of other Internet-enabled services (e.g., email, bill payment, etc.). The system may comprise a STB control and middleware platform 136 that may expose necessary services to STBs 118 such as electronic program guide data, channel maps, etc. This platform/server may talk to a database 124 containing a list of households, associated STB hardware IDs, user profiles for all the various household users, parental controls settings, profiles for individual recommended content, etc. Other layers of middleware may be included between the IP video middleware platform 128 and the STB control platform 136.

Figure 3:
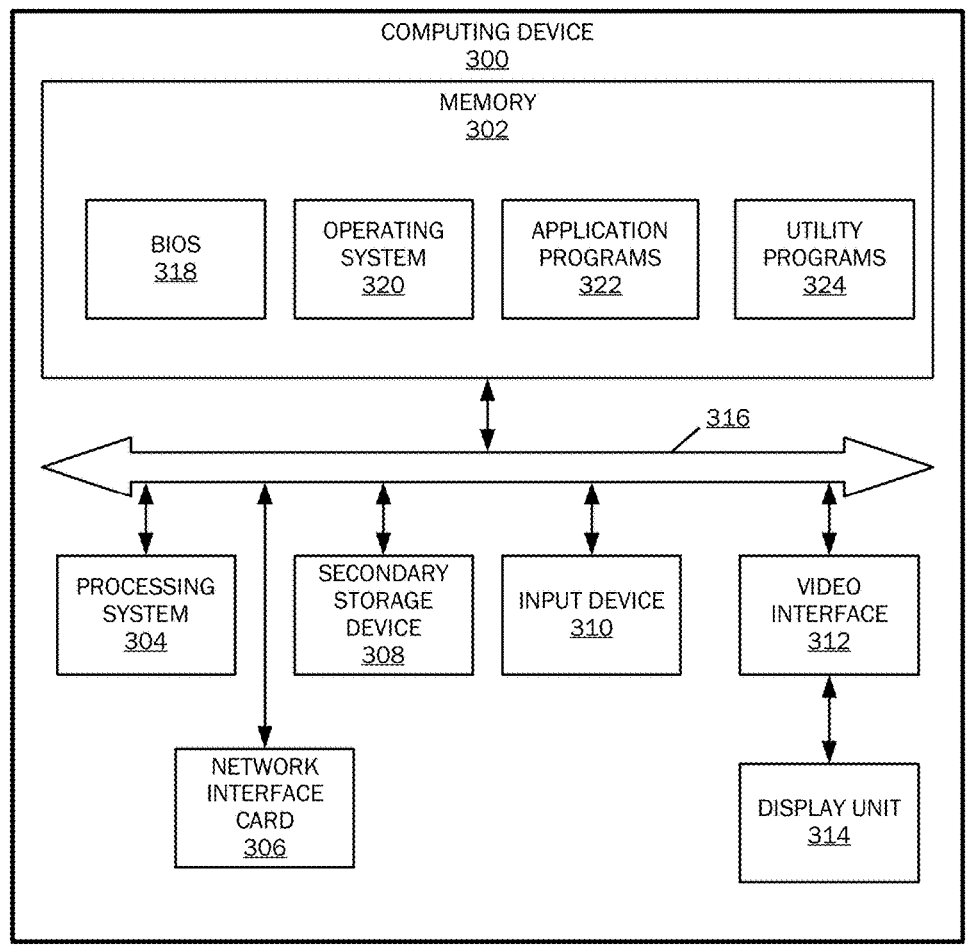
FIG. 3 is a block diagram illustrating example physical components of a computing device with which embodiments may be practiced.

FIG. 3 is a block diagram illustrating example physical components of a computing device 300 with which embodiments may be practiced. In some embodiments, one or a combination of the components a video product may be implemented using one or more computing devices like the computing device 300. It should be appreciated that in other embodiments, a video product may be implemented using computing devices having hardware components other than those illustrated in the example of FIG. 3.

Computing devices may be implemented in different ways in different embodiments. For instance, in the example of FIG. 3, the computing device includes a processing system 304, memory 302, a network interface card 306, a secondary storage device 308, an input device 310, a video interface 312, a display unit 314, and a communication medium 316. In other embodiments, the computing device 300 may be implemented using more or fewer hardware components (e.g., a video interface, a display unit, or an input device) or in combination with other types of computer systems and program modules.

The memory 302 includes one or more computer-readable storage media capable of storing data and/or computer-executable instructions. According to one embodiment, a video product may be stored locally on computing device 300. Memory 302 thus may store the computer-executable instructions that, when executed by processor 304, provide synchronization of users between disparate video distribution systems as described above with reference to FIGS. 1-2.

In various embodiments, the memory 302 is implemented in various ways. For example, the memory 302 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium refers only to devices and articles of manufacture that store data and/or computer-executable instructions readable by a computing device. Computer-readable storage medium do not include communications media. The term computer-readable storage media encompasses volatile and nonvolatile and removable and non-removable media implemented in various methods or technologies for storage and retrieval of information. Such information can include data structures, program modules, computer-executable instructions, or other data.

The processing system 304 includes one or more processing units, which may include tangible integrated circuits that selectively execute computer-executable instructions. In various embodiments, the processing units in the processing system 304 are implemented in various ways. For example, the processing units in the processing system 304 can be implemented as one or more processing cores. In this example, the processing system 304 can comprise one or more Intel Core microprocessors. In another example, the processing system 304 can comprise one or more separate microprocessors. In yet another example embodiment, the processing system 304 can comprise Application-Specific Integrated Circuits (ASICs) that provide specific functionality. In yet another example, the processing system 304 provides specific functionality by using an ASIC and by executing computer-executable instructions.

The computing device 300 may be enabled to send data to and receive data from a communication network via a network interface card 306. In different embodiments, the network interface card 306 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 308 includes one or more computer-readable storage media, and may store data and computer-executable instructions not directly accessible by the processing system 304. That is, the processing system 304 performs an I/O operation to retrieve data and/or computer-executable instructions from the secondary storage device 308. In various embodiments, the secondary storage device 308 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 310 enables the computing device 300 to receive input from a user. Example types of input devices include, but are not limited to, keyboards, mice, trackballs, stylus input devices, key pads, microphones, joysticks, touch-sensitive display screens, and other types of devices that provide user input to the computing device 300.

The video interface 312 outputs video information to the display unit 314. In different embodiments, the video interface 312 is implemented in different ways. For example, the video interface 312 may be a video expansion card. In another example, the video interface 312 may be integrated into a motherboard of the computing device 300. In various embodiments, the display unit 314 can be a an LCD display panel, a touch-sensitive display panel, an LED screen, a projector, a cathode-ray tube display, or another type of display unit. In various embodiments, the video interface 312 may communicate with the display unit 314 in various ways. For example, the video interface 312 can communicate with the display unit 314 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 316 facilitates communication among the hardware components of the computing device 300. In different embodiments, the communications medium 316 facilitates communication among different components of the computing device 300. For instance, in the example of FIG. 3, the communications medium 316 facilitates communication among the memory 302, the processing system 304, the network interface card 306, the secondary storage device 308, the input device 310, and the video interface 312. In different embodiments, the communications medium 316 may be implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 may store various types of data and/or software instructions. For instance, in the example of FIG. 3, the memory 302 stores a Basic Input/Output System (BIOS) 318, and an operating system 320. The BIOS 318 includes a set of software instructions that, when executed by the processing system 304, cause the computing device 300 to boot up. The operating system 320 may include a set of software instructions that, when executed by the processing system 304, may cause the computing device 300 to provide an operating system that coordinates the activities and sharing of resources of the computing device 300. The memory 302 also stores one or more application programs 322 that, when executed by the processing system 304, cause the computing device 300 to provide applications to users, for example, a video distribution product. The memory 302 also stores one or more utility programs 324 that, when executed by the processing system 304, cause the computing device 300 to provide utilities to other software programs. Embodiments of the present invention may be utilized in various distributed computing environments where tasks are performed by remote processing devices that are linked through a communications network in a distributed computing environment.

Figure 4:
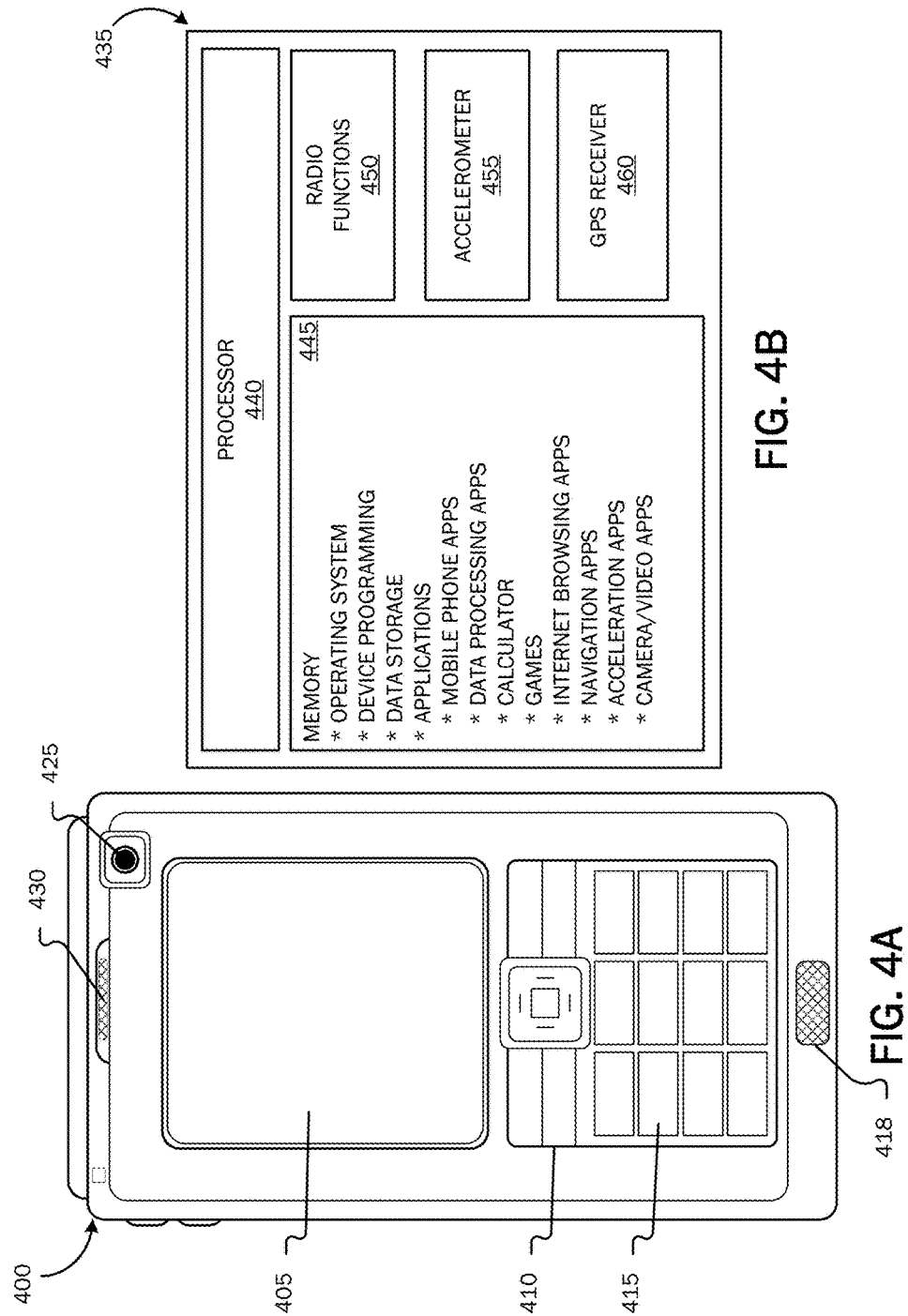
FIGS. 4A-4B illustrate a suitable mobile computing environment with which embodiments may be practiced.

FIGS. 4A-4B illustrate a suitable mobile computing environment, for example, a smart phone 112, a tablet 114, personal computer/laptop 300, and the like, with which embodiments may be practiced. The mobile computing device 400 is illustrative of any suitable device operative to send, receive and process wireless communications according to embodiments of the present invention. A display screen 405 is operative for displaying a variety of information such as information about incoming and outgoing communications, as well as, a variety of data and displayable objects, for example, text, alphanumeric data, photographs, and the like.

Data input to the device 400 may be performed via a variety of suitable means, such as, touch screen input via the display screen 405, keyboard or keypad input via a data entry area 410, key input via one or more selectable buttons or controls 415, voice input via a microphone 418 disposed on the device 400, photographic input via a camera 425 functionality associated with the mobile computing device, or any other suitable input means. Data may be output via the device 400 via any suitable output means, including but not limited to, display on the display screen 405, audible output via an associated speaker 430 or connected earphone system, vibration module for providing tactile output, and the like.

Referring now to FIG. 4B, operational unit 435 is illustrative of internal operating functionality of the mobile computing device 400. A processor 440 is illustrative of a general purpose computer processor for processing incoming and outgoing data and communications and controlling operation of the device and associated software applications via a mobile computing device operating system. Memory 445 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of a video product may be stored locally on mobile computing device 400.

Mobile computing device 400 may contain an accelerometer 455 for detecting acceleration, and can be used to sense orientation, vibration, and/or shock. Mobile computing device 400 may contain a global positioning system (GPS) system (e.g., GPS send/receive functionality) 460. A GPS system 460 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 450 include all required functionality, including onboard antennae, for allowing the device 400 to communicate with other communication devices and systems via a wireless network. Radio functions 450 may be utilized to communicate with a wireless or Wi-Fi-based positioning system to determine a device's 400 location.

Figure 5:
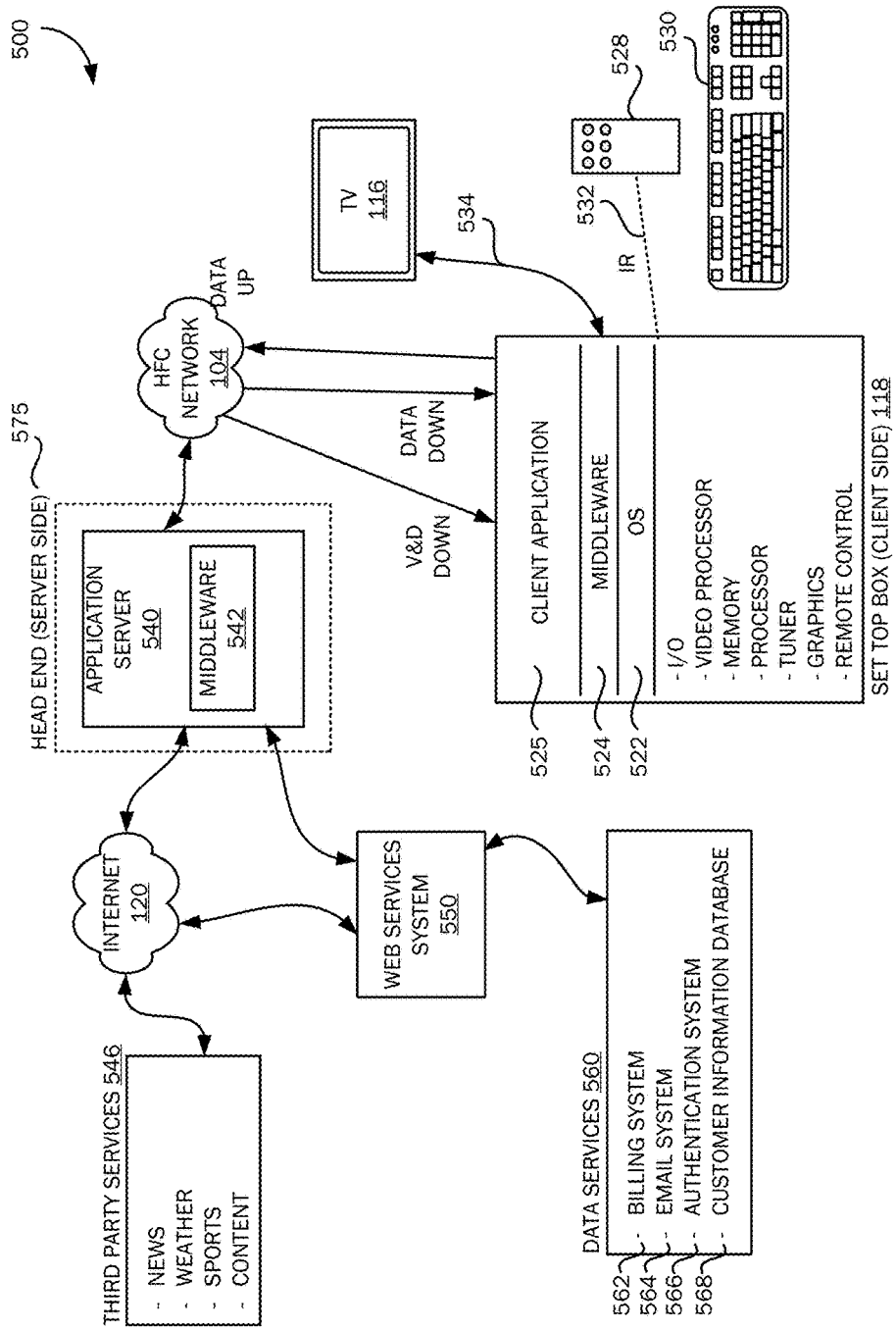
FIG. 5 is a simplified block diagram illustrating a cable television services system architecture providing an operating environment according to an embodiment.

FIG. 5 is a simplified block diagram illustrating a cable television services system 500 (hereafter referred to as "CATV") architecture providing an operating environment according to an embodiment. As can be appreciated, a CATV architecture is but one of various types of systems that may be utilized to provide synchronization of users between disparate video distribution systems. Referring now to FIG. 5, digital and analog video programming, information content and interactive television services are provided via a hybrid fiber coax (HFC) network 104 to a television set 116 for consumption by a cable television/services system customer. As is known to those skilled in the art, HFC networks 515 combine both optical fiber and coaxial cable lines. Typically, optical fiber runs from the cable head end 575 to neighborhoods of subscribers. Coaxial cable runs from the optical fiber feeders to each customer or subscriber. The functionality of the HFC network 104 allows for efficient bidirectional data flow between the client-side set-top box 118 and a server-side application server 540.

The CATV system 500 is in the form of a distributed client-server computing system for providing video and data flow across the HFC network 104 between server-side services providers (e.g., cable television/services providers) via a server-side head end 575 and a client-side customer via a client-side set-top box (STB) 118 functionally connected to a customer receiving device, such as the television set 116. As is understood by those skilled in the art, modern CATV systems 500 may provide a variety of services across the HFC network 115 including traditional digital and analog video programming, telephone services, high speed Internet access, video-on-demand, and information services.

On the client side of the CATV system 500, digital and analog video programming and digital and analog data are provided to the customer television set 116 via the set-top box (STB) 118. Interactive television services that allow a customer to input data to the CATV system 500 likewise are provided by the STB 118. As illustrated in FIG. 5, the STB 118 is a multipurpose computing device having a computer processor, memory, and an input/output mechanism. The input/output mechanism receives input from server-side processes via the HFC network 104 and from customers via input devices such as the remote control device 528, keyboard 530, or other computing device, such as a tablet/slate computer 114, smart phone 112, etc. The remote control device 528 and the keyboard 530 may communicate with the STB 118 via a suitable communication transport such as the infrared connection 532. The STB 118 also includes a video processor for processing and providing digital and analog video signaling to the television set 116 via a cable communication transport 534. A multi-channel tuner is provided for processing video and data to and from the STB 118 and the server-side head end system 575, described below.

The STB 118 also includes an operating system 522 for directing the functions of the STB 118 in conjunction with a variety of client applications 525. For example, if a client application 525 requires a news flash from a third-party news source to be displayed on the television set 116, the operating system 522 may cause the graphics functionality and video processor of the STB 118, for example, to output the news flash to the television set 116 at the direction of the client application 525 responsible for displaying news items. According to embodiments, the operating system 522 may include a video product as described herein.

Because a variety of different operating systems 522 may be utilized by a variety of different brands and types of set-top boxes, a middleware layer 524 may be provided to allow a given software application to be executed by a variety of different operating systems. According to an embodiment, the middleware layer 524 may include a set of application programming interfaces (APIs) that are exposed to client applications 525 and operating systems 522 that allow the client applications to communicate with the operating systems through common data calls understood via the API set. As described below, a corresponding middleware layer is included on the server side of the CATV system 500 for facilitating communication between the server-side application server and the client-side STB 118. The middleware layer 542 of the server-side application server and the middleware layer 524 of the client-side STB 118 may format data passed between the client side and server side according to the Extensible Markup Language (XML).

According to one embodiment, the set-top box 118 passes digital and analog video and data signaling to the television set 116 via a one-way communication transport 534. According to other embodiments, two-way communication transports may be utilized, for example, via high definition multimedia (HDMI) ports. The STB 118 may receive video and data from the server side of the CATV system 500 via the HFC network 104 through a video/data downlink and data via a data downlink. The STB 118 may transmit data from the client side of the CATV system 500 to the server side of the CATV system 500 via the HFC network 104 via one data uplink. The video/data downlink is an "in band" downlink that allows for digital and analog video and data signaling from the server side of the CATV system 500 through the HFC network 104 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 5, between the HFC network 104 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 540 is typically passed through the "out of band" data links. Alternatively, an "in band" data carousel may be positioned in an "in band" channel into which a data feed may be processed from the server-side application server 540 through the HFC network 104 to the client-side STB 118. Operation of data transport between components of the CATV system 500, described with reference to FIG. 5, is well known to those skilled in the art.

Referring still to FIG. 5, the head end 575 of the CATV system 500 is positioned on the server side of the CATV system and includes hardware and software systems responsible for originating and managing content for distributing through the HFC network 104 to client-side STBs 118 for presentation to customers via television sets 116. As described above, a number of services may be provided by the CATV system 500, including digital and analog video programming, interactive television services, telephone services, video-on-demand services, targeted advertising, and provision of information content.

The application server 540 is a general-purpose computing system operative to assemble and manage data sent to and received from the client-side set-top box 118 via the HFC network 104. As described above with reference to the set-top box 118, the application server 540 includes a middleware layer 542 for processing and preparing data from the head end 575 of the CATV system 500 for receipt and use by the client-side set-top box 118. For example, the application server 540 via the middleware layer 542 may obtain data from third-party services 546 via the Internet 120 for transmitting to a customer through the HFC network 104 and the set-top box 118. For example, content metadata a third-party content provider service may be downloaded by the application server via the Internet 120. When the application server 540 receives the downloaded content metadata, the middleware layer 542 may be utilized to format the content metadata for receipt and use by the set-top box 118. Therefore, content metadata may be sent and categorized based on the availability to the customer's program guide data.

According to one embodiment, data obtained and managed by the middleware layer 542 of the application server 540 is formatted according to the Extensible Markup Language and is passed to the set-top box 118 through the HFC network 104 where the XML-formatted data may be utilized by a client application 525 in concert with the middleware layer 524, as described above. As should be appreciated by those skilled in the art, a variety of third-party services data, including news data, weather data, sports data and other information content may be obtained by the application server 540 via distributed computing environments such as the Internet 120 for provision to customers via the HFC network 104 and the set-top box 118.

According to embodiments, the application server 540 obtains customer support services data, including billing data, information on customer work order status, answers to frequently asked questions, services provider contact information, and the like from data services 560 for provision to the customer via an interactive television session. As illustrated in FIG. 5, the services provider data services 560 include a number of services operated by the services provider of the CATV system 500 which may include data on a given customer.

A billing system 562 may include information such as a customer's name, street address, business identification number, Social Security number, credit history, and information regarding services and products subscribed to by the customer. According to embodiments, the billing system 562 may also include billing data for services and products subscribed to by the customer for bill processing, billing presentment and payment receipt.

A customer information database 568 may include general information about customers such as place of employment, business address, business telephone number, and demographic information such as age, gender, educational level, and the like. The customer information database 568 may also include information on pending work orders for services or products ordered by the customer. The customer information database 568 may also include general customer information such as answers to frequently asked customer questions and contact information for various service provider offices/departments. As should be understood, this information may be stored in a variety of disparate databases operated by the cable services provider.

Referring still to FIG. 5, web services system 550 is illustrated between the application server 540 and the data services 560. According to embodiments, web services system 550 serves as a collection point for data requested from each of the disparate data services systems comprising the data services 560. According to embodiments, when the application server 540 requires customer services data from one or more of the data services 560, the application server 540 passes a data query to the web services system 550. The web services system formulates a data query to each of the available data services systems for obtaining any required data for a requesting customer as identified by a set-top box identification associated with the customer. The web services system 550 serves as an abstraction layer between the various data services systems and the application server 540. That is, the application server 540 is not required to communicate with the disparate data services systems, nor is the application server 540 required to understand the data structures or data types utilized by the disparate data services systems. The web services system 550 is operative to communicate with each of the disparate data services systems for obtaining necessary customer data. The customer data obtained by the web services system is assembled and is returned to the application server 540 for ultimate processing via the middleware layer 542, as described above.

An authentication system 566 may include information such as secure user names, subscriber profiles, subscriber IDs, and passwords utilized by customers for access to network services. As should be understood by those skilled in the art, the disparate systems 562, 564, 566, 568 may be integrated or provided in any combination of separate systems, wherein FIG. 5 shows only one example.

Embodiments the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-5. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for synchronizing users between disparate video distribution systems, the method comprising:
   receiving an indication of a login request on a first system of a plurality of systems that are disparate relative to one another;
   in response to the login request, authenticating that a user is entitled to service on a requesting device associated with the first system;
   configuring the first system to recognize one or more individual user accounts associated with a household subscription account;
   receiving an indication of a selection of an individual user account of the one or more individual user accounts associated with the household subscription account;
   providing the service to the requesting device associated with the first system based on the selected individual user account;
   linking the household subscription account of the first system to another household subscription account of at least one other system of the plurality of systems by an account identifier associated with the user;
   via the account identifier, providing the service to the user on the same requesting device via the other household subscription account associated with the at least one other system based on only the authentication that entitled the user to service via the requesting device associated with the first system;

receiving an indication of a user action via the requesting device of the first system associated with the individual user account of the household subscription account; and as a result of the account identifier linking the household subscription account of the first system to the other household subscription account of the at least one other system on the same requesting device, synchronizing data associated with the user action with the at least one other system of the plurality of systems, such that the user action on the first system causes an action to take place on the same requesting device associated with the at least one other system.

2. The method of claim 1, further comprising:
providing a selective option to save the requesting device to a list of authorized devices; and
if an indication of selection to save the requesting device to the list of authorized devices is received, saving the requesting device to the list of authorized devices associated with the account identifier.

3. The method of claim 1, wherein receiving an indication of a login request via a strong authentication on a first system comprises receiving an indication of a login request via one or more of:
a username and password;
a retina scan authentication;
a fingerprint scan;
a gesture authentication;
a social network login authentication; or
an email address and a password.

4. The method of claim 1, further comprising receiving an indication of selection of a next individual user account of one of the one or more individual user accounts associated with the household subscription account from the requesting device and providing the service to the requesting device based on the selected individual user account.

5. The method of claim 4, wherein receiving an indication of a selection of a next individual user account of one of the one or more individual user accounts associated with the household subscription account does not require a strong authentication tied to the individual user account.

6. The method of claim 1, wherein synchronizing data associated with the user action with the plurality of systems comprises synchronizing one or more of:
bookmarks;
recordings;
viewing history;
parental control permissions;
pin codes;
user behavior data;
user feedback;
changes to the household subscription account;
user account profile data; or
deletion of content.

7. The method of claim 6, further comprising providing recommendations to the individual user account based on the synchronized data associated with the user action.

8. A system for synchronizing users between disparate video distribution systems, the system comprising:
a memory storage; and
one or more processing units coupled to the memory storage, wherein the one or more processing units are operable to:
receive an indication of a login request on a first system of a plurality of systems that are disparate relative to one another;
in response to the login request, authenticate that a user is entitled to service on a requesting device;
configure the first system to recognize one or more individual user accounts associated with a household subscription account;
receive an indication of a selection of an individual user account of the one or more individual user accounts associated with the household subscription account;
provide the service to the requesting device associated with the first system based on the selected individual user account;
linking the household subscription account of the first system to another household subscription account of at least one other system of the plurality of systems by an account identifier associated with the user;
via the account identifier, provide the service to the user on the same requesting device via the other household subscription account associated with the at least one other system based on only the authentication that entitled the user to service via the requesting device associated with the first system;
receive an indication of a user action via the requesting device of the first system associated with the individual user account of the household subscription account; and
as a result of the account identifier linking the household subscription account of the first system to the other household subscription account of the at least one other system on the same requesting device, synchronize data associated with the user action with at least one other system of the plurality of systems, such that the user action on the first system causes an action to take place on the same requesting device associated with the at least one other system.

9. The system of claim 8, wherein the one or more processing units are further operable to:
provide a selective option to save the requesting device to a list of authorized devices; and
if an indication of selection to save the requesting device to the list of authorized devices is received, save the requesting device to the list of authorized devices associated with the account identifier.

10. The system of claim 8, wherein in receiving an indication of a login request via a strong authentication on a first system, the one or more processing units are operable to receive an indication of a login request via one or more of:
a username and a strong password;
a retina scan authentication;
a fingerprint scan;
a gesture authentication;
a social network login authentication; or
an email address and a strong password.

11. The system of claim 8, wherein the one or more processing units are further operable to receive an indication of selection of a next individual user account of one of the one or more individual user accounts associated with the household subscription account from the requesting device and provide the service to the requesting device based on the selected individual user account.

12. The system of claim 11, wherein in receiving an indication of a selection of a next individual user account of one of the one or more individual user accounts associated with the household subscription account, the one or more processing units do not require a strong authentication tied to the next individual user account.

13. The system of claim 8, wherein in synchronizing the data associated with the user action with the plurality of systems, the one or more processing units are further operable to synchronize one or more of:
- bookmarks;
- recordings;
- viewing history;
- parental control permissions;
- pin codes;
- user behavior data;
- user feedback;
- changes to the household subscription account;
- user account profile data; or
- deletion of content.

14. The system of claim 13, wherein the one or more processing units are further operable to provide recommendations to the individual user account based on the synchronized data associated with the user action.

15. A computer-readable storage device which stores a set of instructions which when executed performs a method for synchronizing users between disparate video distribution systems, the method executed by the set of instructions comprising:
- receiving an indication of a login request on a first system of a plurality of systems that are disparate relative to one another;
- in response to the login request, authenticating that a user is entitled to service on a requesting device associated with the first system;
- configuring the first system to recognize one or more individual user accounts associated with a household subscription account;
- receiving an indication of a selection of an individual user account from the one or more individual user accounts associated with the household subscription account;
- providing the service to the requesting device associated with the first system based on the selected individual user account;
- linking the household subscription account of the first system to another household subscription account of at least one other system of the plurality of systems by an account identifier associated with the user;
- via the account identifier, providing the service to the user on the same requesting device via the other household subscription account associated with the at least one other system based on only the authentication that entitled the user to service via the requesting device associated with the first system;
- receiving an indication of a user action via the requesting device of the first system associated with the individual user account of the household subscription account; and
- as a result of the account identifier linking the household subscription account of the first system to the other household subscription account of the at least one other system on the same requesting device, synchronizing data associated with the user action with at least one other system of the plurality of systems, such that the user action on the first system causes an action to take place on the same requesting device associated with the at least one other system.

16. The computer-readable storage device of claim 15, wherein synchronizing data associated with the user action with the plurality of systems comprises synchronizing one or more of:
- bookmarks;
- recordings;
- viewing history;
- parental control permissions;
- pin codes;
- user behavior data;
- user feedback;
- changes to the household subscription account;
- user account profile data; or
- deletion of content.

17. The computer-readable storage device of claim 16, further comprising providing recommendations to the individual user account based on the synchronized data associated with the user action.

18. The computer-readable storage device of claim 15, further comprising:
- providing a selective option to save the requesting device to a list of authorized devices; and
- if an indication of selection to save the requesting device to the list of authorized devices is received, saving the requesting device to the list of authorized devices associated with the account identifier.

19. The computer-readable storage device of claim 15, further comprising receiving an indication of selection of a next individual user account of one of the one or more individual user accounts associated with the household subscription account from the requesting device and providing the service to the requesting device based on the selected individual user account.

20. The method of claim 1, wherein the account identifier is a unique account number tied to the household subscription account for the first system.

* * * * *